United States Patent
Xie et al.

(10) Patent No.: US 11,617,483 B2
(45) Date of Patent: Apr. 4, 2023

(54) CLEANING ROBOT

(71) Applicant: SHENZHEN SILVER STAR INTELLIGENT GROUP CO., LTD., Shenzhen (CN)

(72) Inventors: Xiaodan Xie, Shenzhen (CN); Changtai Xia, Shenzhen (CN); Xiao Hu, Shenzhen (CN)

(73) Assignee: SHENZHEN SILVER STAR INTELLIGENT GROUP CO., LTD., Shenzhen (CN)

( * ) Notice: Subject to any disclaimer, the term of this patent is extended or adjusted under 35 U.S.C. 154(b) by 273 days.

(21) Appl. No.: 17/006,429

(22) Filed: Aug. 28, 2020

(65) Prior Publication Data
US 2021/0338029 A1 Nov. 4, 2021

(30) Foreign Application Priority Data
Apr. 30, 2020 (CN) .......................... 202010367351.1

(51) Int. Cl.
| | |
|---|---|
| *A47L 11/40* | (2006.01) |
| *A47L 13/26* | (2006.01) |
| *B08B 3/02* | (2006.01) |
| *B25J 5/00* | (2006.01) |
| *B25J 11/00* | (2006.01) |
| *B25J 9/00* | (2006.01) |
| *A47L 9/28* | (2006.01) |

(52) U.S. Cl.
CPC ......... *A47L 9/2852* (2013.01); *A47L 11/4083* (2013.01); *A47L 13/26* (2013.01); *B08B 3/024* (2013.01); *B25J 5/007* (2013.01); *B25J 11/0085* (2013.01); *B25J 9/0003* (2013.01)

(58) Field of Classification Search
CPC .... A47L 9/2852; A47L 11/4083; A47L 13/26; A47L 2201/00; A47L 11/4016; A47L 11/302; A47L 11/40; A47L 11/4013; A47L 11/4041; A47L 11/408; B08B 3/024; B25J 5/007; B25J 11/0085; B25J 9/0003
See application file for complete search history.

(56) References Cited

U.S. PATENT DOCUMENTS

| | | | |
|---|---|---|---|
| 2014/0182627 A1* | 7/2014 | Williams | ............ A47L 11/4088 134/21 |
| 2019/0290089 A1* | 9/2019 | Johnson | ................ A47L 11/305 |
| 2020/0121153 A1* | 4/2020 | Letsky | .................. A47L 9/2873 |

FOREIGN PATENT DOCUMENTS

| | | | |
|---|---|---|---|
| CN | 101252868 | * | 8/2018 |
| WO | WO2018149311 | * | 8/2018 |
| WO | WO2018149312 | * | 8/2018 |

* cited by examiner

*Primary Examiner* — David Redding
(74) *Attorney, Agent, or Firm* — Yu Gang

(57) ABSTRACT

The present disclosure discloses a cleaning robot, including a housing, a receiving tank, and a liquid storage tank. The housing is provided with a first groove and a second groove spaced apart from each other. The receiving tank is located in the first groove and configured to receive dirt. The liquid storage tank is located in the second groove and configured to store a cleaning liquid. In the cleaning robot of the present disclosure, the receiving tank and the liquid storage tank are arranged separately and spaced apart from each other, such that the volume of the liquid storage tank is increased, thereby allowing a larger area to be cleaned with a tank of water stored.

20 Claims, 6 Drawing Sheets

346 344 34 348 342   32

CLEANING ROBOT

CROSS-REFERENCE TO RELATED APPLICATION

This application claims priority to Chinese Patent Application No. 2020103673511, filed with the National Intellectual Property Administration, PRC on Apr. 30, 2020, entitled "Cleaning Robot", which is incorporated herein by reference in its entirety.

TECHNICAL FIELD

The present disclosure relates to the technical field of cleaning devices, and in particular to a cleaning robot.

BACKGROUND ART

There is a current trend toward intelligence in the development of the household appliance industry. With the development of information technology, more and more intelligent household appliances have gradually come into our life. A cleaning robot is one of the intelligent household cleaning devices, which can automatically complete the floor cleaning operation in a room with certain artificial intelligence. This reduces the intensity of manual labor and provides convenience for modern life.

In general, the cleaning robot is a robot that completes cleaning, vacuuming, floor mopping, and floor washing operations. The cleaning robots may be further divided into dry cleaning robots and wet cleaning robots according to use or nonuse of liquids, wherein the dry cleaning robots include floor sweeping robots and vacuuming robots, and the wet cleaning robots include floor mopping robots and floor washing robots. Generally, a water tank is arranged inside the wet cleaning robot, and the water tank is partitioned into a clean water chamber and a dirty water chamber, so as to facilitate the removal and placement of the water tank. However, the water tank is designed with a relatively small shape and volume due to the limited space inside the cleaning robot. As a result, the clean water chamber has a relatively small water storage volume, and hence only a small area can be cleaned with a tank of water stored.

SUMMARY

The present disclosure provides a cleaning robot, comprising: a housing, provided with a first groove and a second groove spaced apart from each other; a receiving tank, located in the first groove and configured to receive dirt; and a liquid storage tank, located in the second groove and configured to store a cleaning liquid.

BRIEF DESCRIPTION OF DRAWINGS

In order to more clearly illustrate technical solutions of embodiments of the present disclosure or of the prior art, drawings required for use in the description of the embodiments or the prior art will be described briefly below. It is obvious that the drawings in the following description are merely illustrative of some embodiments of the present disclosure. It will be understood by those of ordinary skill in the art that other drawings can also be obtained according to the structures shown in these drawings without any inventive effort.

Figure 1:
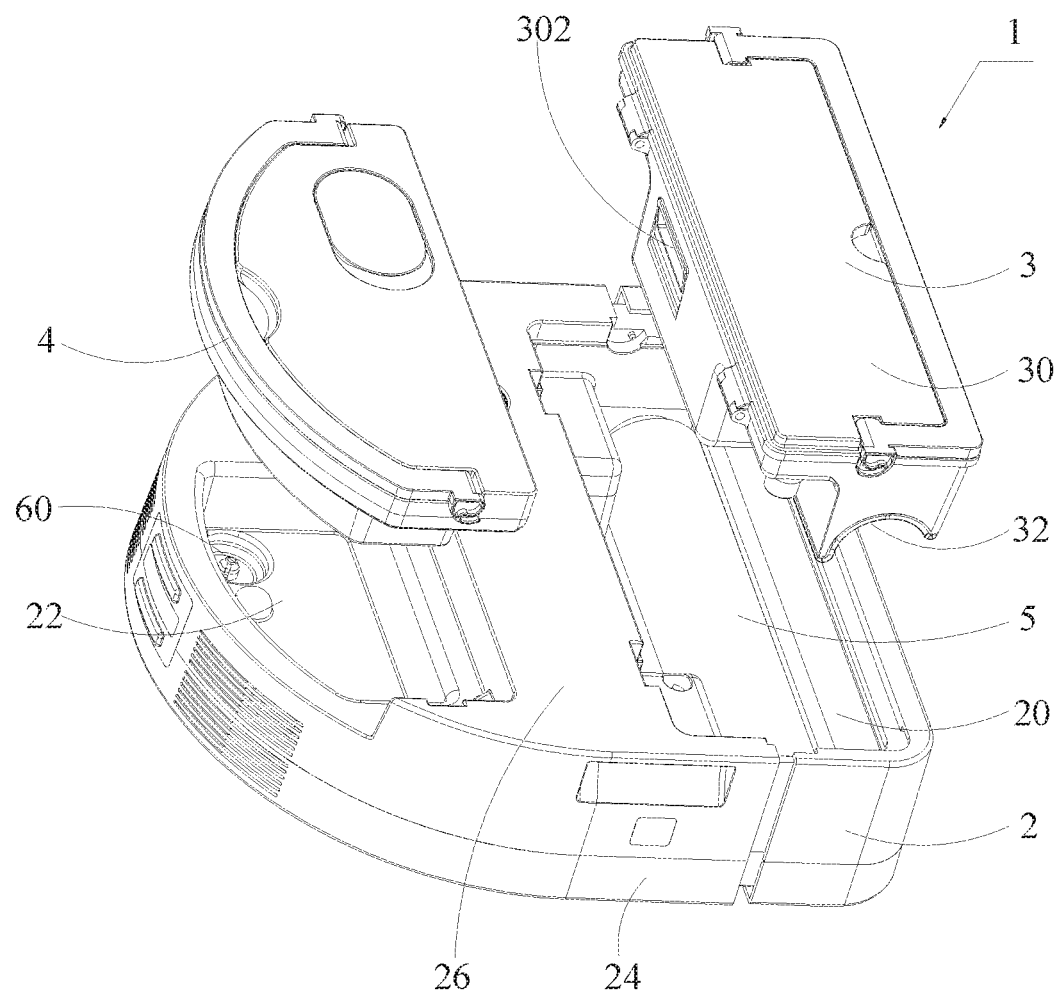
FIG. 1 is an exploded schematic view of an embodiment of a cleaning robot of the present disclosure.

The implementation of the objectives, functional features, and advantages of the present disclosure will be further described in connection with the embodiments and with reference to the drawings.

DETAILED DESCRIPTION OF EMBODIMENTS

The technical solutions of the embodiments of the present disclosure will be described below clearly and completely with reference to the drawings of the embodiments of the present disclosure. It is apparent that the embodiments to be described are merely some, but not all of the embodiments of the present disclosure. All the other embodiments obtained by those of ordinary skill in the art in light of the embodiments of the present disclosure without inventive efforts will fall within the scope of the present disclosure as claimed.

It should be noted that all directional indications (such as up, down, left, right, front, back, etc.) in the embodiments of the present disclosure are intended only to explain, for example, the relative positional relationships or movement states of respective components in a particular posture (as shown in the drawings), and the directional indications change accordingly, if the particular posture changes.

In addition, the terms such as "first" and "second", if present in the present disclosure, are described for descriptive purposes only, and should not be understood as an indication or implication of relative importance or an implicit indication of the number of the indicated technical features. Therefore, a feature defined with the terms "first" or "second" may explicitly or implicitly include one or more such features. In addition, the technical solutions of the various embodiments may be combined with each other without departing from the scope implementable by those of ordinary skill in the art. When a combination of technical solutions is self-contradictory or is not implementable, the combination of technical solutions should not be considered to exist and not fall within the scope as claimed by the present disclosure.

The main object of the present disclosure is to provide a cleaning robot, which aims at an increased clean water volume of a water tank to allow a larger area to be cleaned with a tank of water stored.

In order to achieve the above object, the present disclosure provides a cleaning robot, comprising: a housing, provided with a first groove and a second groove spaced apart from each other; a receiving tank, located in the first groove and configured to receive dirt; and a liquid storage tank, located in the second groove and configured to store cleaning liquid.

Optionally, the cleaning robot further comprises: a cleaning roller, arranged in the housing and located under the receiving tank, wherein both a portion of the first groove corresponding to the cleaning roller and a portion of the bottom of the housing corresponding to the cleaning roller are arranged with a gap therefrom; and a liquid supply mechanism, arranged in the housing and having a liquid inlet end, configured to communicate with the liquid storage tank and a liquid outlet end, from which the cleaning liquid is discharged to the cleaning roller through the receiving tank.

Optionally, the receiving tank comprises: a tank body, provided with a suction port through which dirt is sucked and a gas evacuation port through which a gas is expelled, and provided with an accommodating groove at its bottom, wherein the accommodating groove accommodates at least part of the cleaning roller, the suction port communicates with the accommodating groove; and a first liquid passage, located in the accommodating groove, arranged along an axial direction of the cleaning roller, and having a liquid discharge portion through which the cleaning liquid is discharged.

Optionally, the receiving tank comprises: a tank body, provided with a suction port through which dirt is sucked and a gas evacuation port through which a gas is expelled; a support, having a first end, hinged to the inside of the tank body and a second end, configured to open or seal the suction port and the gas evacuation port; a sealing structure, configured to keep sealing the suction port and the gas evacuation port by the second end; a jacking rod assembly, arranged in the tank body and extendible from and retractable into the tank body to have a first position and a second position, wherein when in the first position, the jacking rod assembly abuts against and jacks the support, and the suction port and the gas evacuation port are opened by the second end; when in the second position, the jacking rod assembly is moved away from the support, and the suction port and the gas evacuation port are sealed by the second end.

Optionally, the cleaning robot further comprises: a driving wheel assembly, arranged in the housing, wherein the driving wheel assembly comprises a wheel support, fixed in the housing, and a wheel arm, rotatably connected to the wheel support, wherein the wheel arm is provided with a protruding portion corresponding to the jacking rod assembly, and the wheel support is provided with a clearance portion corresponding to the protruding portion, so that the protruding portion is movable with the wheel arm, to have a cooperation position and a separation position, wherein when the protruding portion is in the cooperation position, the protruding portion cooperates with the jacking rod assembly, and the jacking rod assembly is moved to the first position; and when the protruding portion is in the separation position, the protruding portion is separated from the jacking rod assembly, and the jacking rod assembly is moved to the second position.

Optionally, the cleaning robot further comprises: a rotating member, rotatably mounted in the housing and located between the protruding portion and the jacking rod assembly, wherein when the protruding portion is in the cooperation position, the protruding portion cooperates with the jacking rod assembly via the rotating member; and when the protruding portion is in the separation position, the rotating member is separated from the jacking rod assembly.

In the technical solutions of the present disclosure, the housing is provided with a first groove and a second groove spaced apart from each other, and the receiving tank is located in the first groove and the liquid storage tank is located in the second groove, so that the receiving tank and the liquid storage tank are arranged separately and spaced apart from each other. This increases the volume of the liquid storage tank and allows the cleaning robot to clean a larger area with a tank of water stored.

Figure 2:
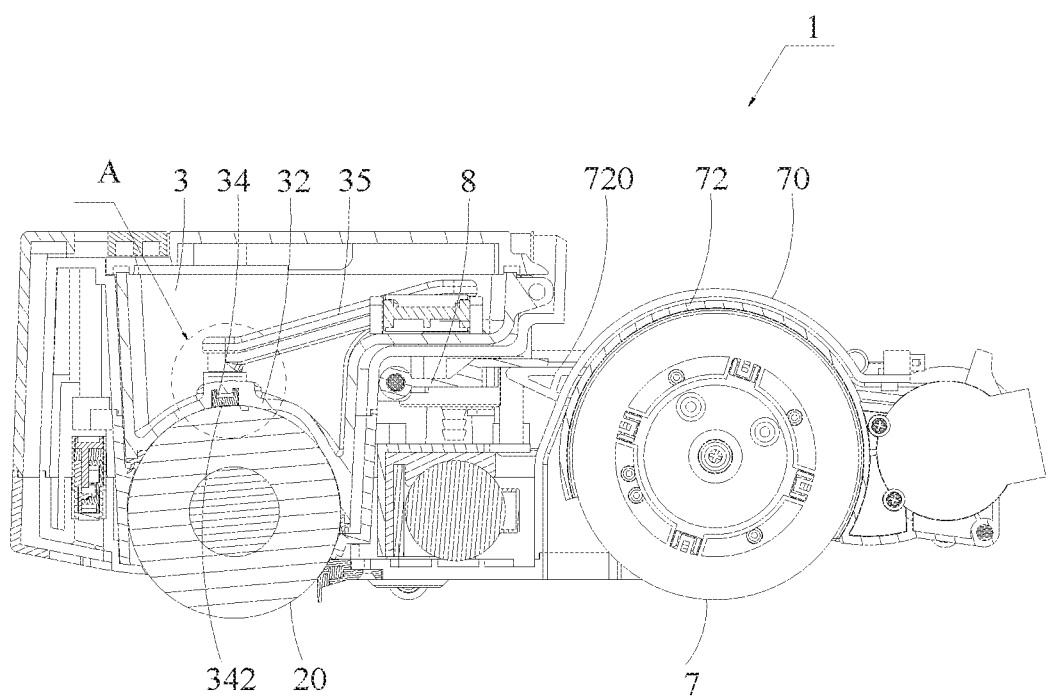
FIG. 2 is a partial sectional view of the cleaning robot in FIG. 1.

The present disclosure provides an embodiment of a cleaning robot. Referring to FIGS. 1 and 2, the cleaning robot 1 comprises a housing 2, a receiving tank 3, and a liquid storage tank 4. Here, the housing 2 is provided with a first groove 20 and a second groove 22 spaced apart from each other. The receiving tank 3 is located in the first groove 20 and configured to receive dirt including, but not limited to, dirty water, debris, dust, mud, and hair. The liquid storage tank 4 is located in the second groove 22 and configured to store cleaning liquid including, but not limited to, clean water, a cleaning agent, a cleaning fluid, and a combination thereof.

In this embodiment, the cleaning robot 1 comprises a first groove 20 and a second groove 22 spaced apart from each other, which are provided on a housing 2. The first groove 20 accommodates a receiving tank 3 and the second groove 22 accommodates a liquid storage tank 4, so that the receiving tank 3 and the liquid storage tank 4 are arranged separately and spaced apart from each other. In this way, the volume of the liquid storage tank 4 is increased, the cleaning robot 1 is allowed to clean a larger area with a tank of the liquid stored, and moreover the structure of the liquid storage tank 4 is simplified as compared with the water tank in which a dirty water chamber and a clean water chamber are integrated.

In this embodiment, both the receiving tank 3 and the liquid storage tank 4 are located in a direction of advancement of the cleaning robot 1, and the receiving tank 3 is located at the front and the liquid storage tank 4 is located at the rear. However, in other embodiments, the receiving tank 3 may be located at the rear and the liquid storage tank 4 is located at the front. In addition, the receiving tank 3 and the liquid storage tank 4 may be separately located in the same groove.

Figure 6:
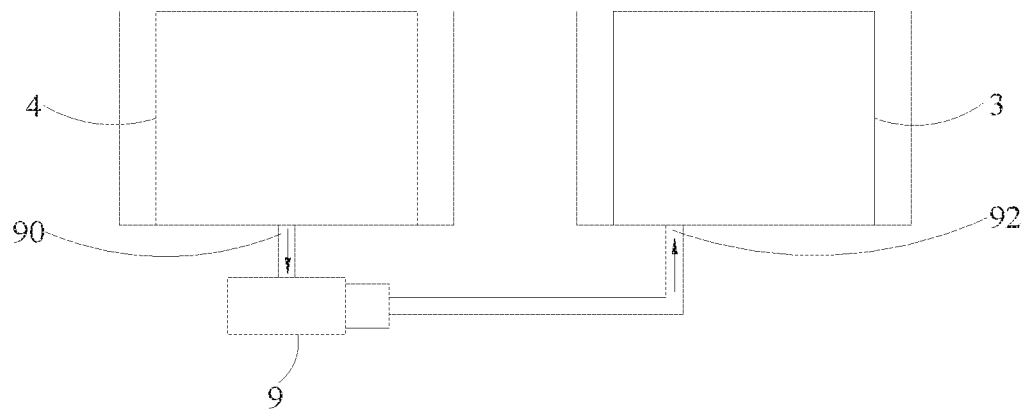
FIG. 6 is a schematic view of a liquid supply mechanism of the cleaning robot in FIG. 1.

Referring to FIGS. 1 and 6, in this embodiment, the cleaning robot 1 further comprises a cleaning roller 5 and a liquid supply mechanism 9. Here, the cleaning roller 5 is arranged in the housing 2 and located under the receiving tank 3. Both a portion of the first groove 20 corresponding to the cleaning roller 5 and a portion of the bottom of the housing 2 corresponding to the cleaning roller 5 are arranged with a gap therefrom, to avoid obstructing the cleaning roller 5 in cleaning the floor. The liquid supply mechanism 9 is arranged in the housing 2 and has a liquid inlet end 90 configured to communicate with the liquid storage tank 4 and a liquid outlet end 92, from which the cleaning liquid is discharged to the cleaning roller 5 through the receiving tank 3.

The cleaning roller 5 is arranged under the receiving tank 3, and the liquid supply mechanism 9 supplies the cleaning liquid in the liquid storage tank 4 to the cleaning roller 5 through the receiving tank 3, namely, the cleaning liquid is directly sprayed and dripped from the receiving tank 3 to the cleaning roller 5 thereunder, to fully wet the cleaning roller 5. Thus, the cleaning effect of the cleaning robot 1 is improved while avoiding the case that water is distributed unevenly on the ground and the ground is partially unwetted when the cleaning liquid is sprayed directly to the ground. However, in other embodiments, a liquid passage may be provided in the shaft of the cleaning roller 5, and the liquid supply mechanism 9 feeds the cleaning liquid into the liquid passage to directly wet the cleaning roller 5.

In this embodiment, the housing 2 comprises a chassis 24 and a surface shell 26. The first groove 20 and the second groove 22 are provided in the surface shell 26. The liquid supply mechanism 9 is located between the chassis 24 and the surface shell 26 and fixed to the surface shell 26. A communication portion 60 is arranged at the bottom of the second groove 22 of the surface shell 26. The communication portion 60 is inserted into the liquid storage tank 4 at one end thereof and communicates with the liquid inlet end 90 of the liquid supply mechanism 9 at the other end thereof, to communicate the liquid storage tank 4 with the liquid supply mechanism. The liquid supply mechanism 9 is further a water pump mechanism. A roller driving component of the cleaning robot 1 is mounted between the chassis 24 and the surface shell 26. A portion of the chassis 24 corresponding to the cleaning roller 5 is arranged with a gap therefrom. Both ends of the cleaning roller 5 are mounted in the housing 2, and one of the ends of the cleaning roller is connected to the roller driving component. The roller driving component drives a rotation of the cleaning roller 5.

In this embodiment, the cleaning robot 1 further comprises a fan and a battery arranged between the surface shell 26 and the chassis 24. The fan and the battery are located in the spacing between the first groove 20 and the second groove 22.

Figure 4:
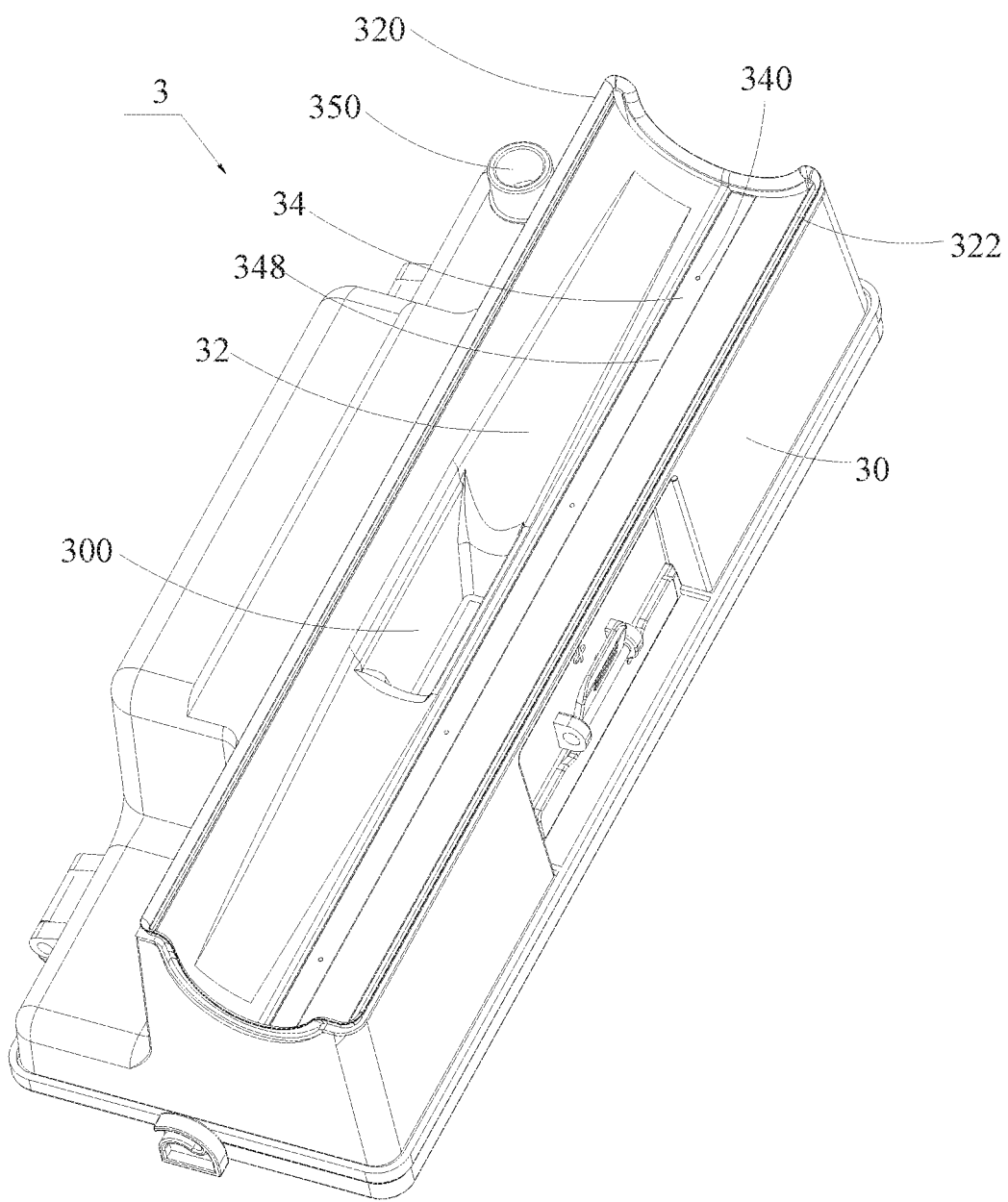
FIG. 4 is a schematic structural view of a receiving tank of the cleaning robot in FIG. 1.
Figure 5:
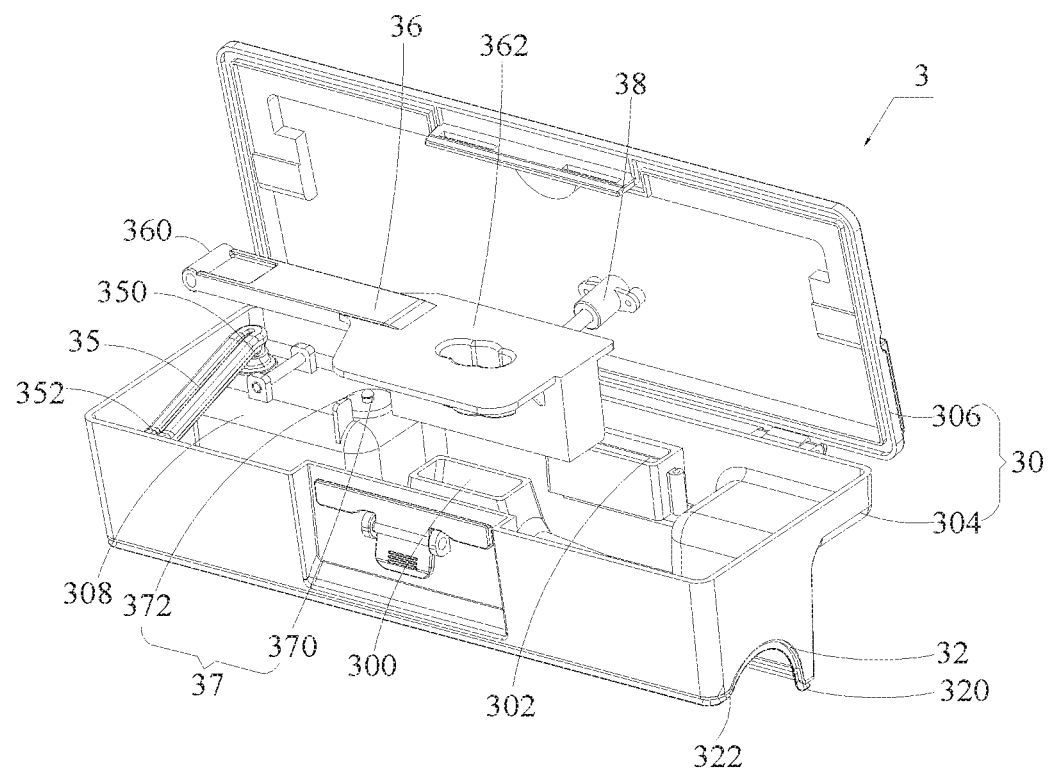
FIG. 5 is an exploded schematic view of the receiving tank in FIG. 4.

Referring to FIGS. 4 and 5, in this embodiment, the receiving tank 3 comprises a tank body 30 and a first liquid passage 34. The tank body 30 is provided with a suction port 300 through which dirt is sucked and a gas evacuation port 302 through which a gas is expelled. The gas evacuation port 302 communicates with the fan. Further, an accommodating groove 32 for accommodating at least part of the cleaning roller 5 is provided at the bottom of the tank body 30, and the accommodating groove 32 communicates with the suction port 300. The first liquid passage 34 is located in the accommodating groove 32, is arranged along the axial direction of the cleaning roller 5, and has a liquid discharge portion from which the cleaning liquid is discharged. The liquid discharge portion further consists of a plurality of liquid discharge holes 340. However, in other embodiments, the liquid discharge portion may be formed by a narrow liquid discharge gap or other structure.

The receiving tank 3 is provided with an accommodating groove 32 for accommodating the cleaning roller 5 at the bottom of the tank body 30, and the first liquid passage 34 is located in the accommodating groove 32, so that the cleaning liquid is discharged directly onto the cleaning roller 5 through the first liquid passage 34 to fully wet the cleaning roller 5. This further improves the cleaning effect. Furthermore, the suction port 300 of the tank body 30 communicates with the accommodating groove 32. When the cleaning roller 5 of the cleaning robot 1 is in operation, the cleaning roller 5 rotates in the accommodating groove 32, which can accelerate the wetting of the cleaning roller 5 and also can raise dirty water, debris, etc. At this time, the fan draws air to expel the gas from the receiving tank 3 through the gas evacuation port 302, so that a negative pressure is formed in the suction port 300, and dirty water and debris can be easily sucked into the receiving tank 3 through the suction port 300 without increasing the suction force from the cleaning robot 1.

In this embodiment, further, the plurality of liquid discharge holes 340 are distributed at intervals along the axial direction of the cleaning roller 5, so that the cleaning liquid can be uniformly distributed on the entire cleaning roller 5 to quickly wet the cleaning roller 5.

Figure 3:
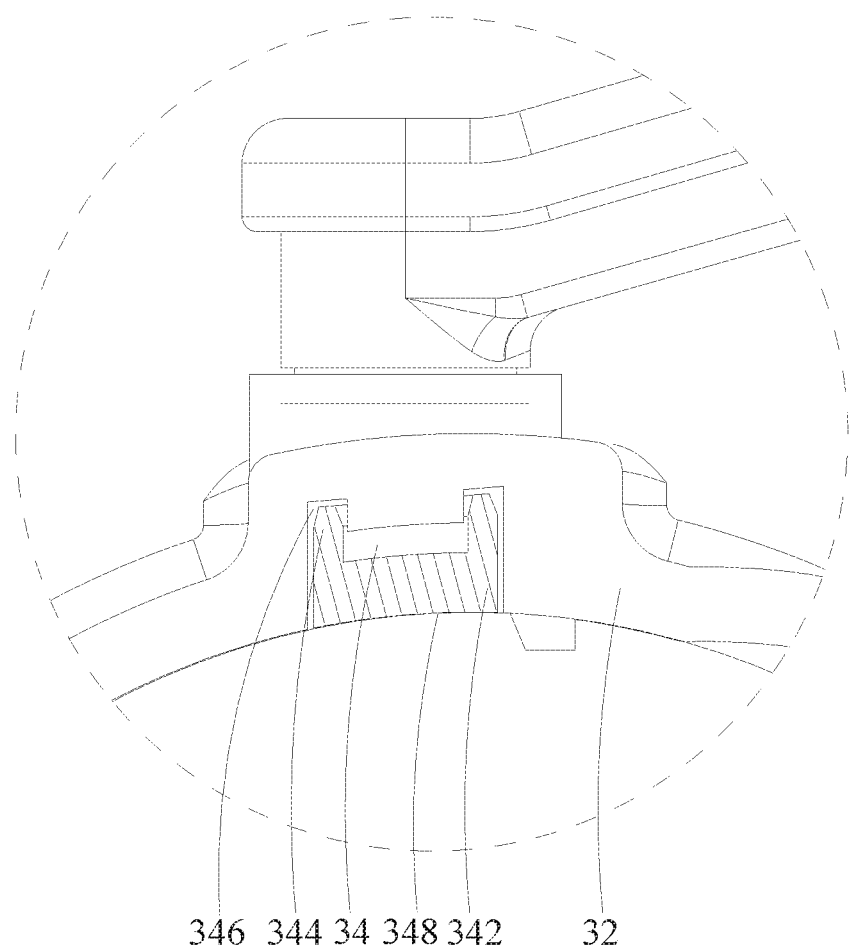
FIG. 3 is an enlarged view of region A in FIG. 2.

Referring to FIGS. 3 and 4, in this embodiment, the first liquid passage 34 comprises an enclosing member 342, and the first liquid passage 34 is formed by looping the enclosing member 342 and a groove wall of the accommodating groove 32. Specifically, the enclosing member 342 is stuck and fixed to the groove wall of the accommodating groove 32 by glue, which provides good sealing property and facilitates assembling. However, in other embodiments, the first liquid passage 34 may be shaped in the groove wall of the accommodating groove 32, namely, a hollow passage is formed in the groove wall, and the plurality of liquid discharge holes 340 are provided in the groove wall. Alternatively, the first liquid passage 34 may be a pipe fixed directly to the groove wall of the accommodating groove 32, and the plurality of liquid discharge holes 340 are provided in the pipe.

Referring to FIGS. 2 and 3, in this embodiment, the enclosing member 342 has two opposite side portions 344. The side portions 344 are arranged along the axial direction of the cleaning roller 5. Two opposite guide slots 346 are formed in the groove wall of the accommodating groove 32. Each of the side portions 344 is located in one of the guide slots 346. The fitting of the side portions 344 with the guide slots 346 allows easy positioning and assembling and provides better gluing and sealing effects.

Referring to FIG. 3, in this embodiment, the enclosing member 342 has a bottom surface 348 and side surfaces. The bottom surface 348 faces the cleaning roller 5. The side surfaces are connected to the bottom surface 348 and arranged along the axial direction of the cleaning roller 5. The plurality of liquid discharge holes 340 are provided in the bottom surface 348. Here, the side surfaces are the outer surfaces of the side portions 344. However, in other embodiments, the enclosing member 342 is arranged to protrude from the groove wall of the accommodating groove 32. Namely, the side surfaces of the enclosing member 342 are not embedded into the guide slots 346 of the groove wall. In this case, the plurality of liquid discharge holes 340 may be provided in the side surfaces. Since the plurality of liquid discharge holes 340 are provided in the side surfaces of the enclosing member 342, the dirt raised up by the cleaning roller 5 is less likely to be in contact with the liquid discharge holes 340, thereby preventing blockage of the liquid discharge holes 340. It can be understood that the enclosing member 342 may be in the shape of a square bar or a round bar. When the enclosing member 342 is in the shape of a round bar, the side surfaces may be understood as surfaces of the enclosing member 342 other than its portion closest to the cleaning roller 5.

Referring to FIG. 5, in this embodiment, the receiving tank 3 further comprises a second liquid passage 35. The second liquid passage 35 is arranged in the tank body 30 and has a liquid inlet 350 provided in the tank body 30 and a liquid outlet 352 communicating with the first liquid passage 34.

The liquid outlet end 92 of the liquid supply mechanism 9 feeds the cleaning liquid from the liquid inlet 350 of the second liquid passage 35. The cleaning liquid flows through the second liquid passage 35 and is discharged from the liquid outlet 352 into the first liquid passage 34. Since the second liquid passage 35 is arranged in the tank body 30, it is isolated from the space contained in the tank body 30, and thus the dirty water in the tank body 30 does not affect the cleaning liquid in the second liquid passage 35. However, in other embodiments, the second liquid passage 35 may be arranged outside the tank body 30 and may communicate with the first liquid passage 34 via a side wall of the tank body 30.

In this embodiment, the second liquid passage 35 may be, but is not limited to, a soft rubber tube or a plastic part with a hollow channel.

In this embodiment, the accommodating groove 32 is arc-shaped. The accommodating groove 32 has a first side 320 and a second side 322 in the axial direction of the cleaning roller 5. The suction port 300 is provided in the groove wall of the accommodating groove 32 between the first side 320 and the first liquid passage 34. The first side 320 is arranged to protrude relative to the second side 322. Since the first side 320 is arranged to protrude relative to the second side 322, namely, the first side 320 of the accommodating groove 32 is closer to the ground, and the suction port 300 is close to the first side 320, dirty water is more easily introduced into the suction port 300 through the first side 320 along the groove wall.

In this embodiment, the first liquid passage 34 is located at the top end of the accommodating groove 32 and is located directly above the cleaning roller 5, so that the cleaning liquid can be completely sprayed and dripped on the cleaning roller 5.

Referring to FIGS. 4 and 5, in this embodiment, the receiving tank 3 further comprises a support 36, a jacking (or lifting) rod component 37, and a sealing structure 38. Here, the support 36 has a first end 360 and a second end 362, the first end 360 is hinged to the inside of the tank body 30, and the second end 362 is configured to open or seal the suction port 300 and the gas evacuation port 302. The sealing structure 38 is configured to keep sealing the suction port 300 and the gas evacuation port 302 by the second end 362. The jacking rod assembly 37 is arranged in the tank body 30 and is extendible from and retractable into the tank body 30, to have a first position and a second position.

When in the first position, the jacking rod assembly 37 abuts against and jacks the support 36, and the suction port 300 and the gas evacuation port 302 are opened by the second end 362.

When in the second position, the jacking rod assembly 37 is moved away from the support 36, and the suction port 300 and the gas evacuation port 302 are sealed by the second end 362.

The support 36 and the jacking rod assembly 37 are arranged in the receiving tank 3, wherein the support 36 is rotatably connected to the inside of the tank body 30, and the jacking rod assembly 37 is arranged movably relative to the tank body 30. When the jacking rod assembly 37 is in the first position, the jacking rod assembly 37 abuts against and jacks the support 36, and the suction port 300 and the gas evacuation port 302 are opened by the second end 362 of the support 36, and then air is drawn away by the fan through the gas evacuation port 302, so that a negative pressure is formed in the suction port 300, and dirty water is sucked into the tank body 30 under the action of the negative pressure. When the jacking rod assembly 37 is in the second position, the jacking rod assembly 37 is moved away from the support 36, and the sealing structure 38 causes the second end 362 of the support 36 to seal the suction port 300 and the gas evacuation port 302. This can ensure the tightness, prevent the leakage of dirty water, and improve the tightness of the receiving tank 3.

In this embodiment, the tank body 30 comprises a tank box 304 and a tank cover 306 arranged to cover the tank box 304. The support 36 and the jacking rod assembly 37 are arranged in the tank box 304. The suction port 300 and the gas evacuation port 302 are provided in the tank box 304. A boss 308 is arranged in the tank box 304, and the jacking rod assembly 37 is arranged on the boss 308 and located under the support 36. Since the jacking rod assembly 37 is located on the boss 308, the jacking rod assembly 37 is located at a higher position to prevent the overflow of dirty water from the jacking rod assembly 37. Moreover, because the jacking rod assembly 37 is located under the support 36, the jacking rod assembly 37 can be moved up and down to lift or lower the support 36, to facilitate the opening or sealing of the suction port 300 and the gas evacuation port 302.

In this embodiment, the jacking rod assembly 37 comprises a jacking shaft 370 and a sealing member 372. The sealing member 372 is located in the tank box 304. The jacking shaft 370 passes through the boss 308 and the sealing member 372, and is movable up and down. The jacking shaft 370 is movable up and down to serve the function of lifting and lowering the support 36. The sealing member 372 serves a sealing function to prevent overflow of dirty water from the joint of the jacking shaft 370. The sealing member 372 is further a sealing rubber pad.

In this embodiment, the first end 360 of the support 36 is arranged on the boss 308, so that the jacking rod assembly 37, which is also located on the boss 308, can more conveniently lift or lower the support 36. However, in other embodiments, the first end 360 of the support 36 may be arranged on the side wall of the tank box 304 or on the inner surface of the tank cover 306. The hinged connection of the first end 360 of the support 36 is achieved by a conventional structure, and therefore will not be described in detail here.

In this embodiment, the sealing structure 38 is a push rod component arranged on the tank cover 306 and abutting against and jacking the support 36 in a direction for sealing the suction port 300 and the gas evacuation port 302. Specifically, the push rod component has a retractable push rod, which always presses down against the second end 362 of the support 36 to seal the suction port 300 and the gas evacuation port 302.

The push rod component can always keep sealing the suction port 300 and the gas evacuation port 302 by the support 36 to prevent leakage when the jacking rod assembly 37 does not abut against the support 36. When the jacking rod assembly 37 abuts against and jacks the support 36, the upward force exerted by the jacking rod assembly 37 is greater than the downward force exerted by the push rod component, so that the suction port 300 and the gas evacuation port 302 are opened. However, in other embodiments, the sealing structure 38 may be a magnetic attraction structure. For example, a first magnetic member is arranged on the suction port 300 and/or the gas evacuation port 302, a second magnetic member is arranged on the support 36, and the first magnetic member and the second magnetic member magnetically attract each other. Alternatively, the sealing structure 38 may be a torsion spring arranged at the hinge joint of the first end 360 of the support 36, and the elastic force of the torsion spring always forces the support 36 to rotate toward the direction for sealing the suction port 300 and the gas evacuation port 302.

In this embodiment, each of the suction port 300 and the gas evacuation port 302 is in the shape of a channel and has an outer end and an inner end. The inner end of the suction port 300 and the inner end of the gas evacuation port 302 are arranged flush with each other. The second end 362 of the support 36 is in the shape of a flat plate and is matched with the inner end of the suction port 300 and the inner end of the gas evacuation port 302. Since the second end 362 of the support 36 is in the shape of a flat plate, it is convenient for the support 36 to simultaneously seal and open the suction port 300 and the gas evacuation port 302, so as to achieve a good matching effect and a good sealing effect.

In this embodiment, a first sealing ring is arranged between the second end 362 of the support 36 and the suction port 300, and a second sealing ring is arranged between the second end 362 of the support 36 and the gas evacuation port 302. The sealing effect is further improved by the first sealing ring and the second sealing ring.

Referring to FIGS. 2 and 5, in this embodiment, the cleaning robot 1 further comprises a driving wheel assembly 7. The driving wheel assembly 7 is arranged in the housing 2 and mounted to the chassis 24. The driving wheel assembly 7 comprises a wheel support 70 and a wheel arm 72. The wheel support 70 is fixed in the housing 2, and the wheel arm 72 is rotatably connected to the wheel support 70. Here, the wheel arm 72 is provided with a protruding portion 720 corresponding to the jacking rod assembly 37, and the wheel support 70 is provided with a clearance portion corresponding to the protruding portion 720, so that the protruding portion 720 is movable with the wheel arm 72 to have a cooperation position and a separation position.

When the protruding portion 720 is in the cooperation position, the protruding portion 720 is cooperated with the jacking rod assembly 37, the jacking rod assembly 37 is moved to the first position, the jacking rod assembly 37 abuts against and jacks the support 36, and thus the suction port 300 and the gas evacuation port 302 are opened by the second end 362.

When the protruding portion 720 is in the separation position, the protruding portion 720 is separated from the jacking rod assembly 37, the jacking rod assembly 37 is moved to the second position, the jacking rod assembly 37 is moved away from the support 36, and thus the suction port 300 and the gas evacuation port 302 are sealed by the second end 362.

In this embodiment, considering the characteristic that the wheel arm 72 rotates relative to the wheel support 70 when the cleaning robot 1 leaves the ground or lands on the ground, a protruding portion 720 is added to the wheel arm 72, and the wheel support 70 is provided with a clearance portion to prevent interference with the rotation of the protruding portion 720. As the protruding portion 720 rotates, it cooperates with the jacking rod assembly 37, so as to open or seal the suction port 300 and the gas evacuation port 302. When the cleaning robot 1 is on the ground, the weight of the robot body causes the wheel arm 72 to rotate upward relative to the robot body to drive the protruding portion 720 to move to the cooperation position, so that the protruding portion 720 jacks the jacking rod assembly 37, and the jacking rod assembly 37 is moved to the first position to open the suction port 300 and the gas evacuation port 302. When the cleaning robot 1 is off the ground or the receiving tank 3 is removed from the cleaning robot, the protruding portion 720 of the wheel arm 72 is separated from the jacking rod assembly 37, and the push rod component causes the support 36 to seal the suction port 300 and the gas evacuation port 302 to prevent leakage of dirty water.

In this embodiment, the cleaning robot 1 further comprises a rotating member 8. The rotating member 8 is rotatably mounted in the housing 2 and located between the protruding portion 720 and the jacking rod assembly 37. When the protruding portion 720 is in the cooperation position, the protruding portion 720 cooperates with the jacking rod assembly 37 via the rotating member 8. When the protruding portion 720 is in the separation position, the rotating member 8 is separated from the jacking rod assembly 37. The rotating member 8 specifically operates in the following manner:

When the cleaning robot 1 is on the ground, the wheel arm 72 rotates and drives the protruding portion 720 to move to the cooperation position, and at the same time the protruding portion 720 drives the rotating member 8 to rotate upward, so that the rotating member 8 cooperates with the jacking rod assembly 37 to push the jacking rod assembly 37 to move to the first position.

When the cleaning robot 1 is off the ground, the wheel arm 72 rotates and drives the protruding portion 720 to move to the separation position, so that the protruding portion 720 is separated from the rotating member 8, the rotating member 8 is separated from the jacking rod assembly 37, and the jacking rod assembly 37 is moved to the second position. When the receiving tank 3 is removed from the cleaning robot 1, the jacking rod assembly 37 is separated from the rotating member 8, and the push rod component causes the support 36 to seal the suction port 300 and the gas evacuation port 302 to prevent leakage of dirty water.

In this embodiment, the rotating member 8 advantageously transmits the rotation of the protruding portion 720 to the jacking rod assembly 37, so that it operates stably with reliable performance. The rotating member 8 is further a rotating plate hinged in the housing 2.

Figure 7:
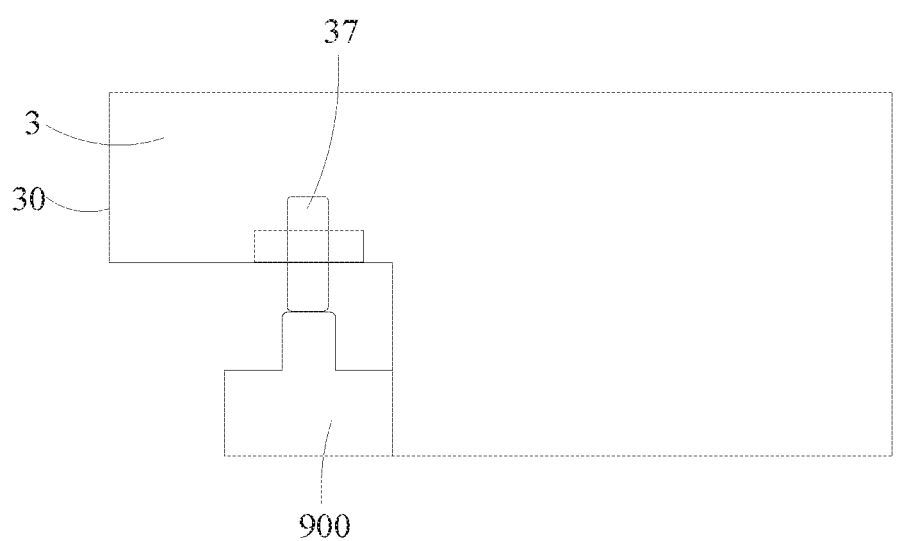
FIG. 7 is a schematic view of a receiving tank of another embodiment of a cleaning robot of the present disclosure.

The present disclosure also provides another embodiment of the cleaning robot. Referring to FIGS. 4, 5 and 7, the cleaning robot 1 of this embodiment is different from the cleaning robot 1 of the above embodiment in that:

The receiving tank 3 of the cleaning robot 1 of this embodiment further comprises a driving mechanism 900. The driving mechanism 900 is arranged outside the tank body 30 and connected to the jacking rod assembly 37. The driving mechanism 900 is configured to drive the movement of the jacking rod assembly 37 to achieve the opening or closing of the suction port 300 and the gas evacuation port 302.

In this embodiment, the driving mechanism 900 may be a cylinder driving mechanism, a motor driving mechanism, or any other driving mechanism, which has a telescopic shaft movable up and down. The telescopic shaft is connected to the jacking rod assembly 37 and drives the jacking rod assembly 37 to move up and down.

With reference to FIGS. 1 and 2, it is obvious that the wheel arm 72 of the driving wheel assembly 7 of the cleaning robot 1 of this embodiment is not provided with the protruding portion 720, and the cleaning robot 1 is not provided with the rotating member 8. A sensing system of the cleaning robot 1 senses the state where the cleaning robot 1 is off or on the ground and the state where the receiving tank 3 is removed, and transmits a sensing signal to a controller of the cleaning robot 1. The controller outputs a control signal to the driving mechanism of the receiving tank 3 according to the sensing signal, so that the telescopic shaft of the driving mechanism is extended or retracted to drive the jacking rod assembly 37 to move up and down. This can also achieve the object of the present disclosure.

Other aspects of the cleaning robot 1 of this embodiment are substantially the same as those of the cleaning robot 1 of the above embodiment, and will not be described in detail here.

The above description is merely illustrative of preferred embodiments of the present disclosure, and hence is not intended to limit the scope of the present disclosure as claimed. Any equivalent structural variations made from the description and drawings of the present disclosure or any direct/indirect applications in other related technical fields under the inventive concept of the present disclosure are included in the scope of the present disclosure as claimed.

What is claimed is:
1. A cleaning robot, comprising:
   a housing, provided with a first groove and a second groove spaced apart from each other;
   a receiving tank, located in the first groove and configured to receive dirt;

a liquid storage tank, located in the second groove and configured to store cleaning liquid;

a cleaning roller arranged in the housing under the receiving tank; and a liquid supply mechanism arranged in the housing and having a liquid inlet end and a liquid outlet end, wherein the liquid inlet end is fluidly coupled to the liquid storage tank and the liquid outlet end discharges the cleaning liquid to the cleaning roller through the receiving tank.

2. The cleaning robot according to claim 1,
wherein both a portion of the first groove corresponding to the cleaning roller and a portion of a bottom of the housing corresponding to the cleaning roller are arranged with a gap therefrom.

3. The cleaning robot according to claim 2, wherein the receiving tank comprises:

a tank body, provided with a suction port through which dirt is sucked and a gas evacuation port through which a gas is expelled, and provided with an accommodating groove at its bottom, wherein the accommodating groove accommodates at least part of the cleaning roller and the suction port communicates with the accommodating groove; and a first liquid passage, located in the accommodating groove, arranged along an axial direction of the cleaning roller, and having a liquid discharge portion through which the cleaning liquid is discharged.

4. The cleaning robot according to claim 3, wherein the first liquid passage comprises an enclosing member, and the first liquid passage is formed by looping the enclosing member and a groove wall of the accommodating groove.

5. The cleaning robot according to claim 4, wherein the enclosing member has two opposite side portions, the side portions are arranged along the axial direction of the cleaning roller, two opposite guide slots are formed in the groove wall of the accommodating groove, and each of the side portions is located in one of the guide slots.

6. The cleaning robot according to claim 4, wherein the enclosing member has a bottom surface and side surfaces, wherein the bottom surface faces the cleaning roller, the side surfaces are connected to the bottom surface and arranged along the axial direction of the cleaning roller, and the liquid discharge portion is provided in the side surfaces.

7. The cleaning robot according to claim 3, wherein the liquid discharge portion comprises a plurality of liquid discharge holes, wherein the plurality of liquid discharge holes are distributed at equal intervals along the axial direction of the cleaning roller.

8. The cleaning robot according to claim 3, further comprising:

a second liquid passage, arranged in the tank body and having a liquid inlet and a liquid outlet, wherein the liquid inlet is provided in the tank body and communicates with the liquid outlet end of the liquid supply mechanism and the liquid outlet communicates with the first liquid passage.

9. The cleaning robot according to claim 3, wherein the accommodating groove is arc-shaped and has a first side and a second side in the axial direction of the cleaning roller, wherein the suction port is provided in the groove wall of the accommodating groove between the first side and the first liquid passage, and the first side is arranged to protrude relative to the second side.

10. The cleaning robot according to claim 1, wherein the receiving tank comprises:

a tank body, provided with a suction port through which dirt is sucked and a gas evacuation port through which a gas is expelled;

a support, having a first end and a second end, wherein the first end is hinged to an inside of the tank body and the second end is configured to open or seal the suction port and the gas evacuation port;

a sealing structure, configured to keep the second end sealing the suction port and the gas evacuation port; and a jacking rod assembly, which is arranged in the tank body, and is configured to be extended from and retracted into the tank body, so as to have a first position and a second position, wherein when in the first position, the jacking rod assembly abuts against and jacks the support, and the suction port and the gas evacuation port are opened by the second end; and when in the second position, the jacking rod assembly is moved away from the support, and the suction port and the gas evacuation port are sealed by the second end.

11. The cleaning robot according to claim 10, wherein the tank body comprises a tank box and a tank cover arranged to cover the tank box, wherein the suction port and the gas evacuation port are provided in the tank box, a boss is arranged in the tank box, and the jacking rod assembly is arranged on the boss and located under the support.

12. The cleaning robot according to claim 11, wherein the jacking rod assembly comprises a jacking shaft and a sealing member, wherein the sealing member is located in the tank box, and the jacking shaft passes through the boss and the sealing member, and is movable up and down.

13. The cleaning robot according to claim 11, wherein the first end of the support is arranged on the boss.

14. The cleaning robot according to claim 11, wherein the sealing structure is a push rod component, wherein the push rod component is arranged on the tank cover and abuts against the second end of the support in a direction for sealing the suction port and the gas evacuation port.

15. The cleaning robot according to claim 11, wherein each of the suction port and the gas evacuation port is in a shape of a channel and has an outer end and an inner end, and the inner end of the suction port and the inner end of the gas evacuation port are arranged flush with each other; and the second end of the support is in a shape of a flat plate and is matched with the inner end of the suction port and the inner end of the gas evacuation port.

16. The cleaning robot according to claim 15, wherein a first sealing ring is arranged between the second end of the support and the suction port, and a second sealing ring is arranged between the second end of the support and the gas evacuation port.

17. The cleaning robot according to claim 10, wherein the receiving tank further comprises a driving mechanism, wherein the driving mechanism is arranged outside the tank body and connected to the jacking rod assembly for driving the jacking rod assembly to move.

18. The cleaning robot according to claim 10, further comprising:

a driving wheel assembly, arranged in the housing, wherein the driving wheel assembly comprises a wheel support and a wheel arm, wherein the wheel support is fixed in the housing and the wheel arm is rotatably connected to the wheel support, wherein the wheel arm is provided with a protruding portion corresponding to the jacking rod assembly, and the wheel support is provided with a clearance portion corresponding to the protruding portion, so that the protruding portion is movable with the wheel arm to have a cooperation position and a separation position, when the protruding portion is in the cooperation position, the protruding portion cooperates with the jacking rod assembly, and the jacking rod assembly is moved to the first position; and when the protruding portion is in the separation position, the protruding portion is separated from the jacking rod assembly, and the jacking rod assembly is moved to the second position.

19. The cleaning robot according to claim 18, further comprising:

a rotating member, rotatably mounted in the housing and located between the protruding portion and the jacking rod assembly, wherein when the protruding portion is in the cooperation position, the protruding portion cooperates with the jacking rod assembly via the rotating member; and when the protruding portion is in the separation position, the rotating member is separated from the jacking rod assembly.

20. The cleaning robot according to claim 4, further comprising:

a second liquid passage, arranged in the tank body and having a liquid inlet and a liquid outlet, wherein the liquid inlet is provided in the tank body and communicates with the liquid outlet end of the liquid supply mechanism and the liquid outlet communicates with the first liquid passage.

* * * * *